Figures 1, 2, 3, 4, 5, 6, 7:
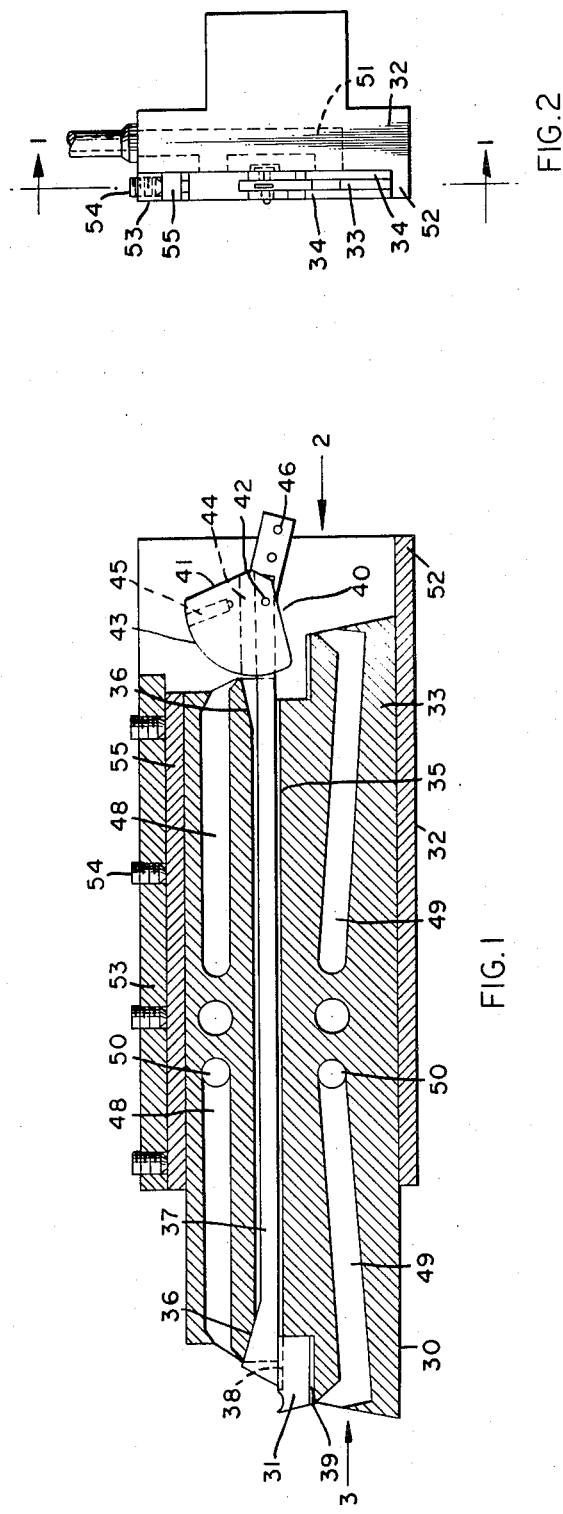

United States Patent [19]
Hanson

[11] 3,798,725
[45] Mar. 26, 1974

[54] CUTTING TOOL

[76] Inventor: Thomas Alec Hanson, 455, Devonshire Ave., Woodstock, Ontario, Canada

[22] Filed: Apr. 20, 1970

[21] Appl. No.: 29,779

[30] Foreign Application Priority Data
Apr. 24, 1969  Great Britain.................... 20871/69

[52] U.S. Cl......................... 29/106 R, 29/96, 82/36
[51] Int. Cl.......................... B26d 1/00, B23b 29/00
[58] Field of Search.......... 29/96, 97, 98, 102, 106; 82/36, 46

[56] References Cited
UNITED STATES PATENTS

| | | | |
|---|---|---|---|
| 3,060,771 | 10/1962 | Johnson | 29/96 |
| 2,203,104 | 6/1940 | Reaney | 29/96 |
| 3,234,828 | 2/1966 | Johnson | 82/36 |
| 3,505,715 | 4/1970 | Germani | 29/96 |
| 3,497,935 | 3/1970 | Bowling | 29/96 |
| 2,789,641 | 4/1957 | Solenberger | 29/97 |
| 3,141,229 | 7/1964 | Nelson | 29/98 |
| 766,144 | 7/1904 | Gilcrest | 29/96 |

FOREIGN PATENTS OR APPLICATIONS

| | | | |
|---|---|---|---|
| 407,699 | 1/1925 | Germany | 29/96 |
| 990,498 | 6/1951 | France | 29/96 |

*Primary Examiner*—Harrison L. Hinson
*Attorney, Agent, or Firm*—

[57] ABSTRACT

A cutting tool which is particularly useful as a cut-off tool includes a tool holder and a replaceable cutting insert. The tool holder comprises a tool body having a passage for a drawbar which holds the insert in a cutting position on the body. The drawbar and the tool body have co-operating inclined surfaces for urging the drawbar into engagement with the insert on movement of the drawbar along the passage. The drawbar is held in a securing position by securing means.

9 Claims, 23 Drawing Figures

PATENTED MAR 26 1974　3,798,725

SHEET 1 OF 3

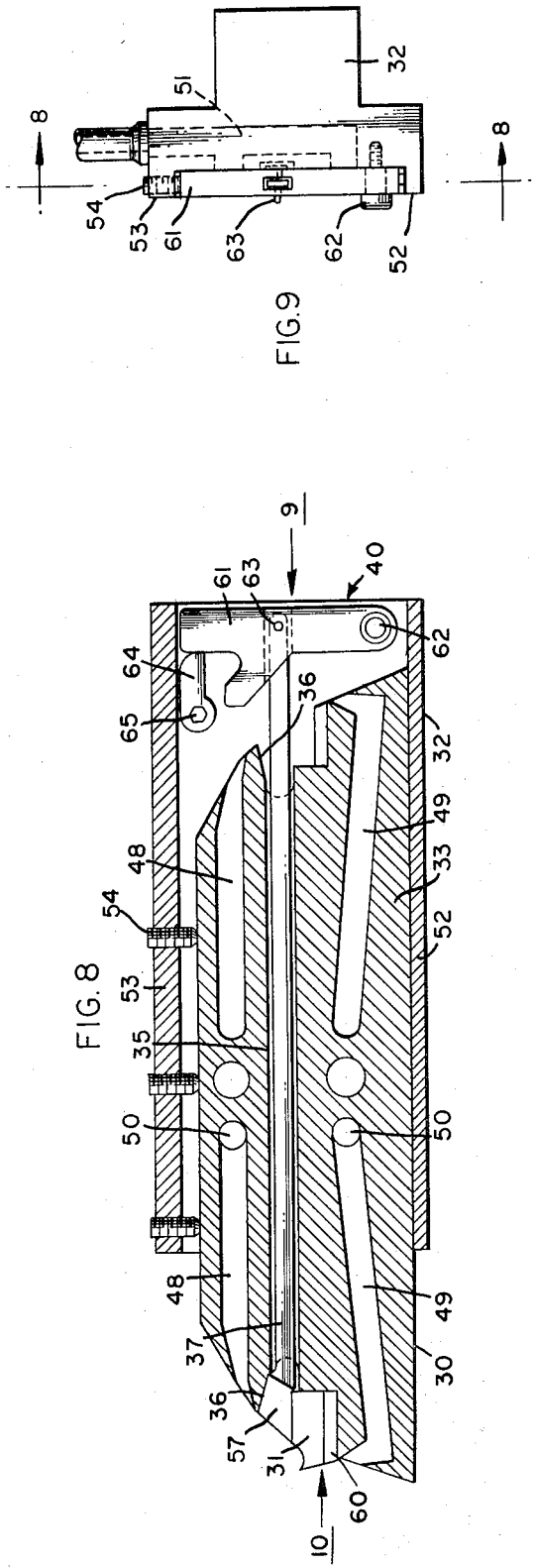
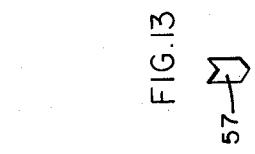
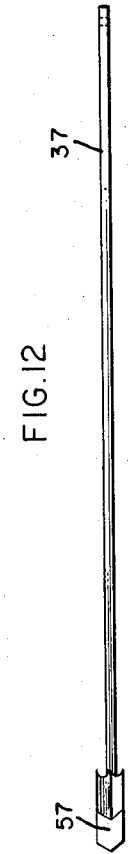
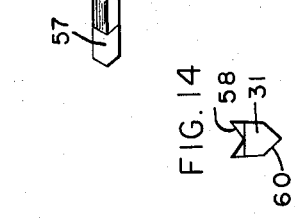
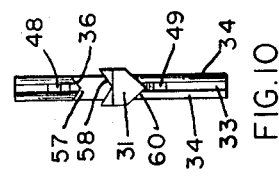

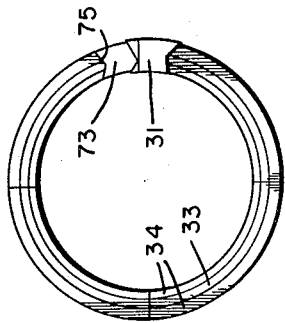
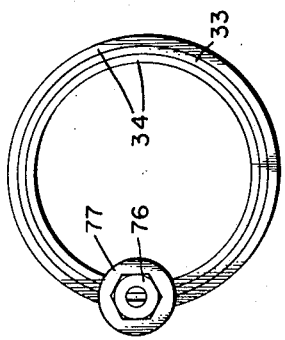
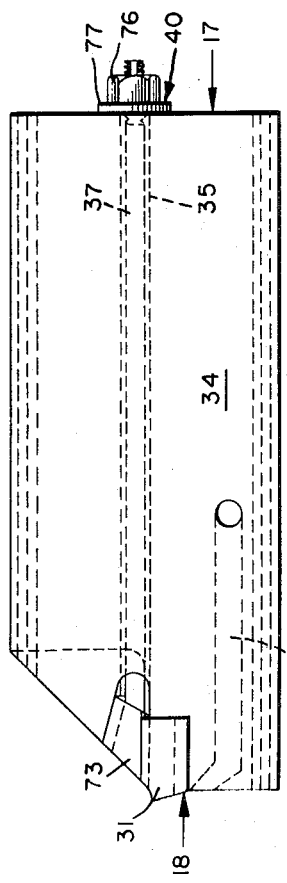
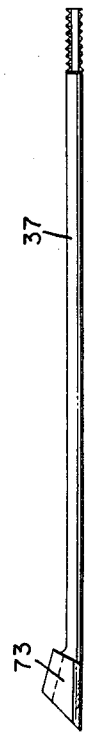
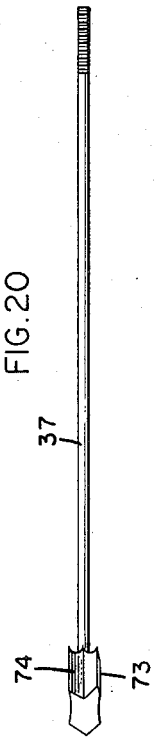
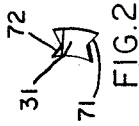
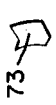

CUTTING TOOL

This invention relates to a cutting tool including a cutting tool holder and a replaceable cutting insert in combination. In particular, but not exclusively, the invention relates to cutting tools for use with metal cutting lathes and shaping, milling, planing or broaching machines.

The invention is envisaged as being applicable particularly to cut-off tools and trepanning tools.

Cutting tools have been proposed in which the hard metal insert has been removably held on the tool holder, either alone or attached to another part of the tool, by a clamping device. The previously-proposed tool holders with releasable inserts suffer from various disadvantages. Among these disadvantages is that the tool holders are relatively expensive to replace and if the inserts fracture the cutting tool holder may be damaged and require replacement. Furthermore the cutting inserts are not always firmly held on the cutting tool body. With known tool holders and replaceable inserts it may take an unduly long time to effect a replacement of the insert, especially when the cutting tool is of small dimensions.

An object of the invention is to provide a cutting tool on which a releasable cutting insert may be held and which obviates disadvantages of present tools and which may be utilised in a parting off type of cutting tool.

According to the invention in a cutting tool holder and replaceable cutting insert combination, the cutting tool holder comprises; a tool body, the body defining a passage extending through the body; elongate drawbar means in said passage and movable along said passage, the drawbar means being engageable with the cutting insert to hold the insert in a cutting position on the body, and said means having an abutment surface inclined with respect to the longitudinal axis of the drawbar means and arranged to engage a correspondingly inclined surface formed on the tool body; the tool further comprising securing means operably connected to the drawbar means to move the drawbar means along said passage towards a securing position in which said inclined surfaces abut one another and cause the drawbar means to engage and hold the cutting insert in said cutting position.

Preferably the drawbar means and the insert are formed with a key and keyway which co-operate together in said cutting position to locate the insert on said body. In addition the cutting insert may be keyed to the tool holder body.

According to a further feature of the invention the tool body includes a duct for carrying fluid coolant to the region of the cutting insert.

The tool body may be of laminated construction having at least two plates secured together in face to face relationship. In such an arrangement the passage extends in the plane of the plates and between the plates. The tool body may be formed of three plates, the central plate having a cut out portion constituting said passage. Further cut out portions may constitute said coolant ducts.

In an alternative arrangement the tool body is formed of two plates one or both plates having channels defining said passage.

The securing means may comprise a pivotable lever lockable in the securing position and secured to the drawbar. The lever may include a cam whereby the lever is lockable in the securing position.

The insert may be double-ended having a cutting edge at each end and reversible so that either one of the two cutting edges may be placed in the cutting position.

The tool body may be of circular or part-circular cross section when the cutting tool is for use as a trepanning tool.

Further features of the invention appear from embodiments of the invention described by way of example and with reference to the drawings in which:

FIG. 1 is a longitudinal section on the line 1—1 in FIG. 2 of one embodiment of cutter tool located in a tool block, FIG. 2 is an end elevation of the tool and tool block in the direction of arrow 2 in FIG. 1, FIG. 3 is an end elevation in the direction of arrow 3 in FIG. 1, FIG. 4 is a side elevation of a drawbar means of the embodiment of FIG. 1, FIG. 5 is an end elevation of the drawbar means of FIG. 4, FIGS. 6 and 7 are end and side elevations respectively of the cutting insert of FIGS. 1 to 3, FIG. 8 is a longitudinal section on the line 8—8 in FIG. 9 of a second embodiment of cutter tool located in a tool block, FIG. 9 is an end elevation in the direction of arrow 9 in FIG. 8, FIG. 10 is an end elevation in the direction of arrow 10 in FIG. 8, FIGS. 11, 12 and 13 are respectively a side elevation, a plan view and an end elevation of the drawbar means of FIGS. 8–10, FIGS. 14 and 15 are an end and a side elevation respectively of the cutting insert of FIGS. 8–10, FIG. 16 is a side elevation of a third embodiment of cutter tool, FIG. 17 is an end elevation in the direction of arrow 17 in FIG. 16, FIG. 18 is an end elevation in the direction of arrow 18 in FIG. 16, FIGS. 19, 20 and 21 are respectively a side elevation, a plan view and an end elevation of the drawbar means of FIGS. 16–18, and FIGS. 22 and 23 are an end and a side elevation respectively of a cutting insert of the tool of FIGS. 16–18.

Referring to the drawings and firstly to FIGS. 1–7, a cutting tool suitable for use as a cut-off or parting-off tool is shown. The tool includes a tool holder in the form of a thin blade or body 30, and a replaceable cutting insert 31 is arranged to be held securely on the body. The body 30 is secured rigidly to a tool block 32.

The tool body 30 is formed of three laminated plates having a central plate 33 sandwiched between two side plates 34 and rivetted or otherwise secured together. The central plate 33 is formed in two halves the halves being spaced from one another to form a rectangular-section passage 35 extending from one end of the body towards the other.

The plates 33 and 34 define a pocket for the cutting insert 31. The upper half of the plate 33 is cut back to provide an inclined abutment surface 36 and a drawbar 37 extends through the passage 35 and is formed with an upwardly inclined surface at its end adjacent the cutting insert 31 which is arranged to co-operate with the inclined surface 36. The edge of the drawbar 37 opposite said inclined surface is formed with a flange 38 which fits into a keyway formed in the top surface of the insert 31. The lower surface of the insert 31 is formed with a key 39 which fits in a slot formed in the pocket of the body 30. The provision of the keys 38 and 39 and co-operating keyways serves to locate the cutting insert 31 rigidly on the tool body 30 when the drawbar 37 is in its securing position.

The drawbar 37 is movable along the passage 35 longitudinally of its length and clearance is provided along the upper and lower sides of the drawbar 37 to allow movement of the drawbar laterally of the passage 35.

The insert 31 is held in position by the drawbar 37 by first causing the drawbar to be moved towards the insert end of the body and then fitting the insert into the pocket with the keys 38 and 39 in their keyways. The drawbar 37 is then drawn back along the passage by securing means 40 at the opposite end of the drawbar so that the inclined surface of the drawbar engages with the co-operating inclined surface 36 and urge the drawbar laterally of the passage and downwardly on to the insert. Thus the drawbar 37 is held in firm engagement with the insert and when the drawbar has been secured in this position the insert cannot be removed from the holder without releasing the securing means 40.

The securing means 40 includes a locking cam 41 secured to the drawbar 37 by a pivot pin 42 about which the cam 41 can pivot. The cam 41 has a curved cam surface 43 for engagement with the end of the body 30, and a slot 44 for receiving the protruding end of the drawbar 37. A hole 45 is formed in the cam 41 for receiving a tommy bar (not shown) for pivoting the cam 41 about the pivot 42. An arm 46 integral with the cam 41 is also provided in case access to the cam from above the body is impeded.

The pin 42 is removable from the cam so that the cam 41 may be released and the drawbar 37 removed from the body 30. It will be seen that the body is symmetrical about its centre line and after removal of the securing means 40 and the drawbar 37, the body can be turned end for end if one end becomes worn or damaged.

It will be appreciated that in order to release the insert 31 the drawbar is moved towards the insert end of the body by pivoting the cam 41 so that the surface 43 is out of engagement with the body. It will also be appreciated that other forms of securing means may be used to hold the drawbar in position.

The tool body 30 is formed with ducts which are formed as slots in the centre plate 33, for leading coolant fluid to the cutting insert 31. Two ducts 48 and 49 are provided at each end of the body, one duct 48 for leading fluid to the upper side of the insert 31 and the other duct 49 for leading fluid to the lower side of the insert. Each duct 48 and 49 is so shaped towards the outlet end that the fluid is caused to be directed towards the insert. The ducts each have inlet openings 50 formed as apertures in a side plate 34 of the body 30 and communicating with a bore 51 formed in the tool block 32. As the holder 30 is symmetrical similar ducts 48 and 49 are formed in the opposite end of the holder 30 for use when the holder is turned end for end.

The body 30 is held in the block 32 between two flanges 52 and 53 integral with the block and extending along the upper and lower edges of the body. The body 30 is held securely between the flanges by screws 54 which pass through the flange 53 to engage a strip 55 which presses against the upper end of the body 30.

Referring now to FIGS. 8 to 15 a further embodiment of the invention is shown similar in many respects to the embodiment of FIGS. 1 to 7. In FIGS. 8 to 15 the same reference numbers are used as in FIGS. 1 to 7 for similar parts. the embodiment of FIGS. 8 to 15 differs from the previous embodiment primarily in the manner of securing the cutting insert to the tool holder.

In this embodiment the drawbar 37 is formed with an enlarged end portion 57 which has a V-shaped inclined upper surface which co-operates with the inclined surface 36 formed on the body 30, the surface 36 also being V-shaped. The lower surface 58 of the portion 57 is also V-shaped to co-operate with a V-shaped notch 59 formed in the upper surface of the insert 31. Similarly the lower surface 60 of the insert 31 is V-shaped and co-operates with a V-shaped base of the pocket formed in the body 30. The insert 31, in this case, is slightly wider than the thickness of the body 30 and the portion 57 of the drawbar 37 ensures that the insert is firmly held on the body.

An alternative form of securing means 40 is employed in this embodiment and includes an arm 61 pivotally secured to the tool block 32 by a pivot pin 62. The arm 61 is secured to the end of the drawbar 37 remote from the insert 31 by a pin 63. The arm 61 can be held in a securing position, as shown, by a cam 64 pivotally carried on a rotatable pin 64 which can be engaged by a locking tool thereby to rotate the cam 64 to a locking position in engagement with the arm 61. To release the arm 61 the cam 64 is pivoted away from the arm and the drawbar 37 can then be moved in the direction towards the insert 31 to release the insert.

It will be appreciated that in this embodiment the surfaces engaging the insert have a greater bearing surface than the previous embodiment and the insert is held against lateral movement with respect to the tool body. In this embodiment the strip 55 of the previous embodiment is omitted and the screws 54 now directly engage the upper surface of the body 30.

Referring now to the third embodiment shown in FIGS. 16 to 23 a cutting tool suitable for use as a trepanning tool is given the same reference numerals as the previous embodiments for similar parts.

The tool has a cylindrical section body formed as a lamination of three plates which are rivetted, welded or otherwise secured together.

The plates include a central plate 33 and two outer plates 34 in face to face contact with the central plate 33. The centre plate 33 is formed with a longitudinal passage 35 extending from one end to the other and a drawbar 37 extends longitudinally through the passage 35 from one end of the passage to the other. The central plate 34 is also formed with a duct 70 through which coolant fluid is passed to a cutting insert 31.

The cutting insert is located in a pocket formed in the tool holder and has a V-shaped lower surface 71 which co-operates with a correspondingly-shaped surface formed in the base of the pocket. The upper surface 72 of the insert 31 is also V-shaped and co-operates with a correspondingly-shaped surface formed on the lower edge of a portion 73 of the drawbar 37. The upper surface 74 of the portion 73 is V-shaped and is inclined with respect to the longitudinal axis of the drawbar 37. The surface 74 co-operates with a similarly inclined surface 75 formed on the tool body and when the insert 31 is firmly secured to the tool body the surfaces 74 and 75 abut one another and cause the drawbar portion 73 to be urged downward into firm engagement with the insert 31. The insert 31 and the portion 73 extend across the full width of the tool body and the co-operating surfaces between the insert 31 the portion 73 and the tool body have bearing areas sufficient to form a stable seating for the insert. Moreover the V-shaped surfaces prevent any lateral movement of the insert 31.

As in the previous two embodiments the drawbar 37 is movable longitudinally to release and to secure the insert on the tool holder and, in this instance, the securing means 40 is in the form of a nut 76 in screw threaded engagement with a portion of the drawbar 37 protruding from the end of the tool body remote from the insert 31. A washer 77 is interposed between the nut 76 and the tool body and the nut bears on the body during tightening of the nut to urge the drawbar towards a securing position.

It will be appreciated that the invention may also be applied to other forms of tool, for example, to tools having a solid form of tool body. Moreover instead of having three laminated plates the tool body may be formed of only two such plates, the drawbar passage and the coolant channels being formed in a face of one or both such plates.

The duct arrangement for fluid coolant in the three embodiments enables the coolant to be directed to the part of the tool requiring the coolant and the flow of coolant is not readily deflected by swarf. Since the duct is formed in the blade the flow of coolant is always directed in the same direction relative to the blade, whatever the position of the blade.

It will also be appreciated that the securing means described may be replaced by alternative forms of securing means. The cutting inserts may be formed of carbide or high speed hardened steel.

The various embodiments described each employ an arrangement for holding the cutting insert in which the insert is urged into firmer engagement with the holder by the forces operating during a cutting action of the tool.

I claim:

1. A cutting tool holder and replaceable cutting insert combination, the cutting tool holder comprising; a tool body, the body defining a pocket having within it a cross sectionally contoured interfitting insert seating surface adapted for seating a correspondingly contoured cutting insert, and having oppositely situated to, and aligned with, said seating surface a cross sectionally contoured interfitting abutment surface, said abutment surface being inclined with respect to said insert seating surface; the said combination further comprising a wedge adapted to secure a cutting insert upon said seating surface within said pocket, said wedge being cross sectionally contoured interfittingly on both sides of its engagement surfaces, one wedge surface being engageable with said abutment surface and the opposite wedge surface being engageable with a correspondingly contoured clamping surface which is formed upon said cutting insert; the said combination further comprising a fluid coolant duct which is formed within said tool body, said coolant duct having inlet openings arranged to co-operate with a coolant supply bore formed in a tool support block, said duct terminating in an outlet located adjacently the projecting face of the cutting insert and being arranged in such manner that a stream of coolant may be positively applied to the underside of the projected cutting edge of the insert.

2. A cutting insert according to claim 1 having both its seating surface and its clamping surface cross-sectionally vee formed.

3. A combination according to claim 1 wherein the wedge means and the insert are formed with a cross sectionally contoured key and keyway which co-operate together in said cutting position to locate the insert on said body.

4. A combination according to claim 3 wherein the insert and the tool holder are formed with a square sectioned key and keyway.

5. A combination according to claim 1 wherein the tool body has formed within it a duct for fluid coolant, said duct having an inlet opening corresponding with a coolant supply bore formed within the tool holder block, and terminating in an outlet jet situated immediately adjacent to the cutting end of the insert so that a coolant stream may be forcibly led to a position very close to the underside of insert's cutting edge.

6. A combination according to claim 1 wherein the tool body is of laminated construction comprising two plates; one of which is plain faced and the other having formed within it an opensided duct for coolant and having also formed within it throughout its length a passage through which a wedge operating drawbar may pass, said plates being joined together in face to face relationship in such manner as to cover said opensided passages and to form one cutting tool body in conformity with claim 1.

7. A combination according to claim 6 wherein the coolant passage and drawbar passage extends in the plane of the plates and between the plates.

8. A combination according to claim 7 wherein the tool body is formed of three plates, the central plates having cut-out portions constituting said passages.

9. A combination according to claim 1 wherein the tool body is of cylindrical form and is of laminated construcion, and wherein the contoured interfitting shapes are Vee-formed in accordance with claim 1 and is thereby adapted to hold a correspondingly formed cutting insert for use in trepanning or in face grooving operations.

* * * * *